E. O. LOEBER.
SAFETY LID FOR RECEPTACLES.
APPLICATION FILED DEC. 22, 1913.
1,123,331.
Patented Jan. 5, 1915.
2 SHEETS—SHEET 1.
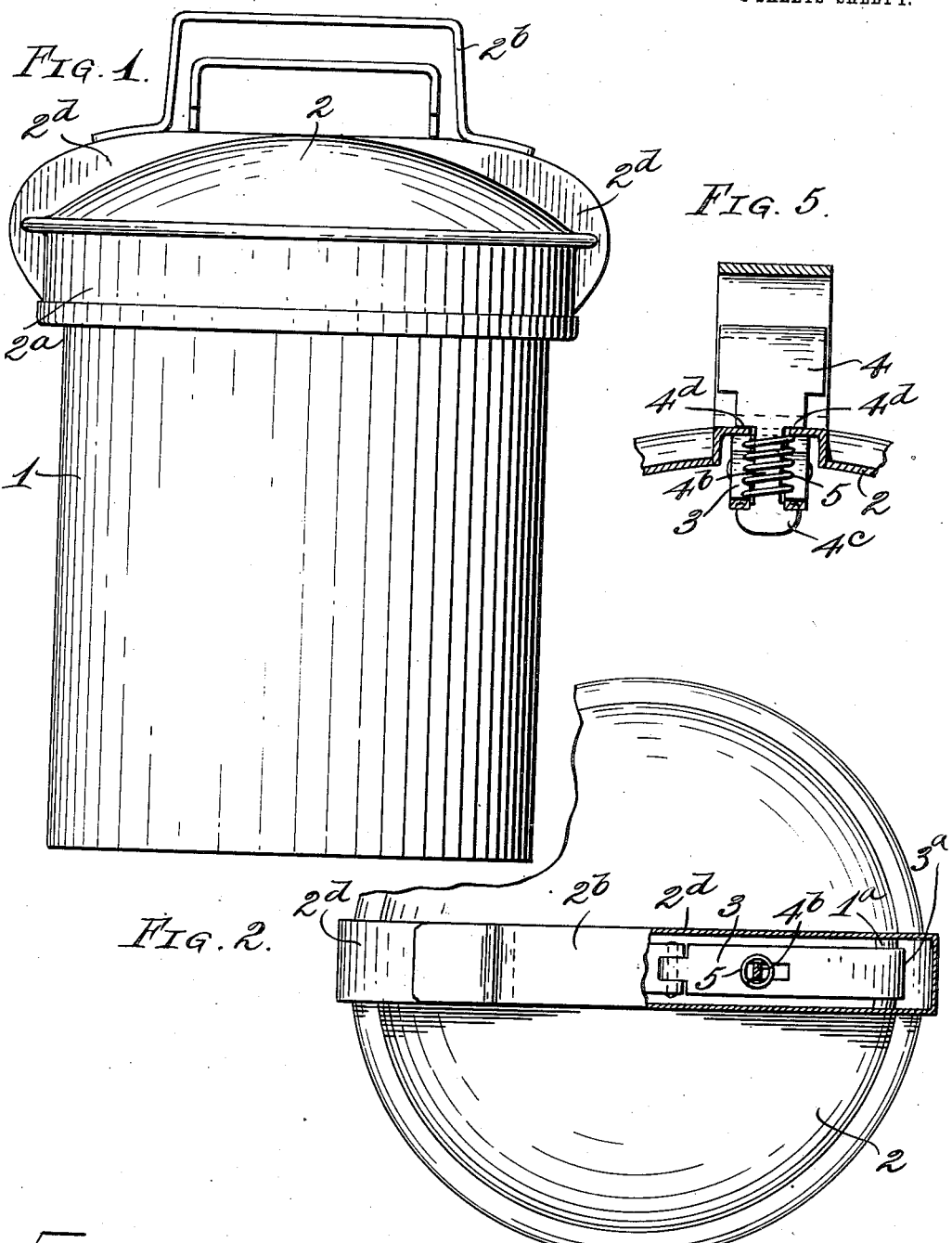
Witnesses:
A. L. Lord.
F. C. Adams.
Inventor.
Edgar O. Loeber
By Okdt Billman
Atty.

E. O. LOEBER.
SAFETY LID FOR RECEPTACLES.
APPLICATION FILED DEC. 22, 1913.
1,123,331.
Patented Jan. 5, 1915.
2 SHEETS—SHEET 2.
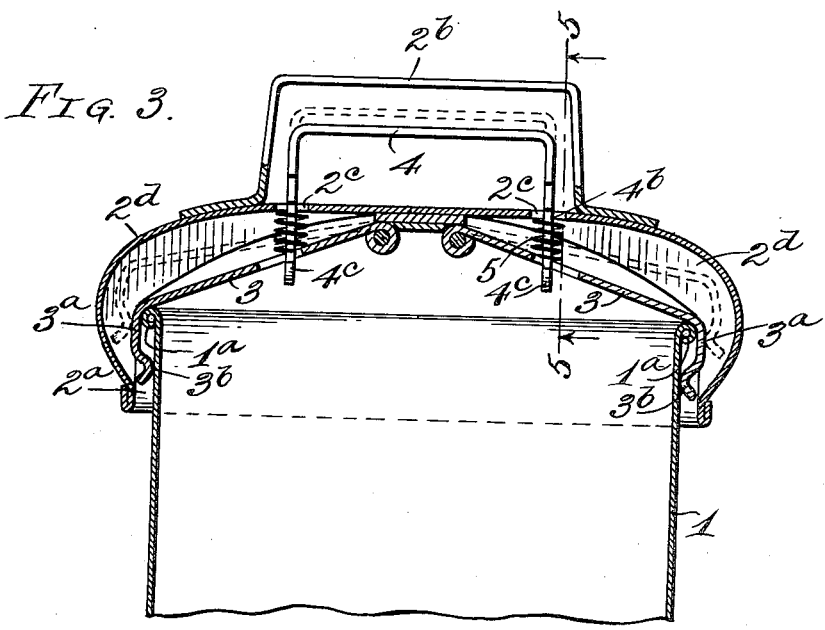
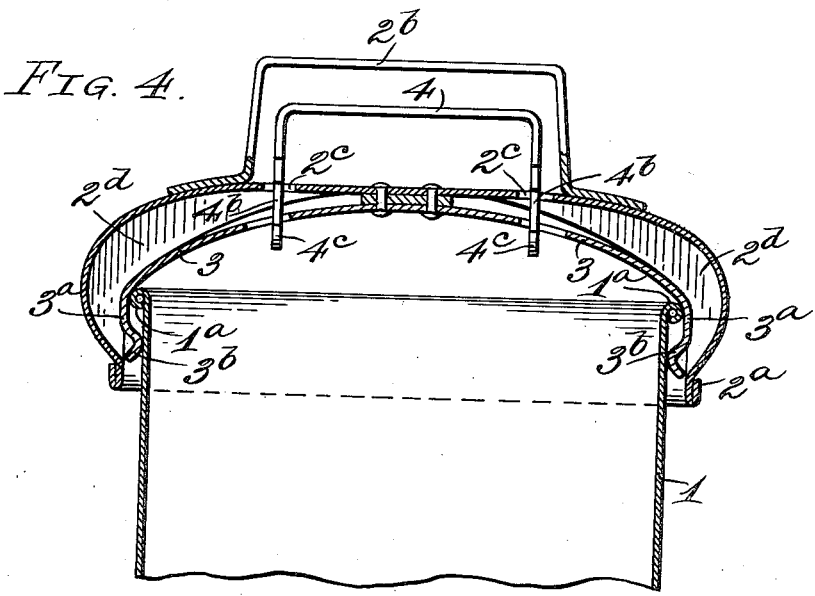
Witnesses:
A. L. Lord.
F. C. Adams.
Inventor,
Edgar O. Loeber
By
Obed S. Dillman, Atty.

UNITED STATES PATENT OFFICE.

EDGAR O. LOEBER, OF CLEVELAND, OHIO.

SAFETY-LID FOR RECEPTACLES.

1,123,331.  Specification of Letters Patent.  Patented Jan. 5, 1915.

Application filed December 22, 1913. Serial No. 808,051.

*To all whom it may concern:*

Be it known that I, EDGAR O. LOEBER, a citizen of the United States, residing at Cleveland, in the county of Cuyahoga and State of Ohio, have invented certain new and useful Improvements in Safety - Lids for Receptacles, of which the following is a specification.

My invention relates to improvements in safety receptacle covers or lids, the primary object being to provide a generally improved safety or self-locking cover or lid for receptacles or containers, the present embodiment being particularly designed and adapted for use in connection with what are commonly known as "garbage cans," or the like, where it is desirable to provide a lid or cover which cannot be removed in the ordinary manner by the application of force upon the outer sides of the lid or cover as in elevating or tilting by animals such as dogs and cats, and the like.

A further object is to provide a lid or cover of this class of exceedingly simple, cheap, and efficient construction and provided with internally arranged locking or latching mechanism adapted to be initially operated or detached before the elevation of the lid or cover through the medium of a handle thereof.

A still further object is to provide an improved lid or cover of this class which may be readily attached to or detached from a can or container of the usual or ordinary construction.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a side elevation of a can or receptacle provided with the improved lid or cover in its locked or closed position. Fig. 2, a top plan view of the improved lid or cover, certain portions being broken away for the purpose of clearer illustration of the parts. Fig. 3, a central vertical sectional view of the same, the dotted lines indicating the position of the parts in detached or unlocked position. Fig. 4, a similar view of a slightly modified form of same. Fig. 5, a cross sectional view taken on line 5—5 of Fig. 3.

Similar numerals of reference designate like parts throughout all the figures of the drawings.

The receptacle 1, may be of any suitable and convenient form and is preferably provided about its upper marginal edges with a beaded rim portion $1^a$, forming a convenient projection or abutment for the attachment of the locking or latching members hereinafter described.

The lid 2, may be of any suitable and convenient form and construction, but is preferably provided with a depending rim portion $2^a$, and a suitable handle loop $2^b$.

As a means for locking or latching the lid or cover 2, in its closed position, as well as providing means whereby the locking mechanism may be only operated or released from the handle or loop portion, a pair of locking or latching members 3, are movably and resiliently mounted within and beneath the lid or cover 2, said latching members or bars 3, being provided at their outer or free ends with depending jaw or finger portions $3^a$, the latter being adapted to take over and engage with the rim or projecting portion $1^a$, of the receptacle, said jaw or depending portions $3^a$, being preferably provided with inwardly extending curved or beveled portions $3^b$, for abutting against or engaging with the beaded or projecting rim portion $1^a$, for preventing the unauthorized detachment or elevation of the rim portion of the lid, the lower beveled or curved part $3^b$, permitting the jaw members to ride over and pass below the beaded rim portion $1^a$, and automatically snap into engagement with the latter when the lid is placed in position and the latching members are not manually held in elevated or detached position through the operating device hereinafter described.

The locking or latching members 3, are preferably made in two parts and pivotally or hingedly connected at their inner ends to the under central portion of the lid or cover as shown most clearly in Figs. 2, 3, and 5, of the drawings, but, if desired, the latching members 3, may be formed from a single strip or length of spring material and attached to the under central portion of the lid or cover as shown in Fig. 4, of the drawings.

As a means for operating or elevating and detaching the locking or latching members 3, an operating handle or loop 4, is provided, said handle or loop 4, being preferably mounted beneath and within the planes of the lid handle loop 2, for convenient operation by the hand while resting upon or connected to the latter.

The operating handle or loop 4, is loosely mounted and connected to the arms or members 3, and is vertically movable in the lid 2, by having its arms $4^a$, passing through openings $2^c$, in the lid, said arms $4^a$, having reduced portions $4^b$, extending through openings in the latching members 3, and being adapted to elevate the latter through the medium of cross heads or projections $4^c$. As a means for causing the locking or latching members 3, (in the form shown in Figs. 2, 3, and 5 of the drawings) to be normally moved to and held in their closed or locked positions, coiled springs 5, are mounted upon the reduced portions $4^b$, and interposed between the locking or latching members 3, and the lid or cover 2, and as a means for limiting the downward movements of the arms or members 3, and the arms $4^a$, of the handle loop 4, the arms $4^a$, are provided with shouldered portions $4^d$, adapted to normally rest upon the top of the lid or cover as shown most clearly in Figs. 3, 4, and 5 of the drawings.

If desired, the locking or latching members 3, may be conveniently housed or covered within a transversely extending house $2^d$, offset from the lid or cover 2, and forming a convenient channel or recess for the movements of the locking or latching members 3.

From the foregoing description, taken in connection with the accompanying drawings, the operation and advantages of my invention will be readily understood.

Having thus described some of the embodiments of my invention, what I claim and desire to secure by Letters Patent is,—

1. In a safety lid for receptacles, a lid member provided with a pair of openings at its top, a pair of spring actuated latching members mounted beneath said lid and provided with openings in alinement with said first mentioned openings, and a handle loop provided with reduced vertically movable arms extending through said openings of said lid and said latching members, said arms being provided with projections at one end engaging said latching members, and shoulders normally resting on said lid for limiting the movements of said latching members.

2. In a safety lid for receptacles, the combination with a lid provided with a depending rim and a handle, and spring actuated latching members mounted beneath said lid and provided with depending jaw portions normally extending within the planes of said depending lid rim; of a vertically movable handle loop provided with arms loosely connected to said latching members, said arms being provided with shouldered portions normally engaging with said lid and serving to limit the closing movements of said jaw portions.

3. A receptacle and safety cover therefor, comprising a receptacle provided with an outwardly extending projection about its upper marginal portion, a lid provided with a handle and having a depending rim portion adapted to fit over said projection at the upper marginal edge of said receptacle, a pair of latching members mounted beneath said lid and provided with jaw portions adapted to take over and engage said projection on said receptacle, and a spring resisted handle loosely connected to said latching members and adapted to move the jaw portions thereof out of engagement with said projection.

4. A safety lid for receptacles, comprising a lid member provided at its top with a handle loop and having a pair of vertically movable horizontally extending latching members connected beneath the central portion of said lid and provided at their outer ends with jaw portions normally resting within the planes of said lid rim, and a second handle loop resting within the planes of said lid handle loop and provided with arms loosely and detachably connected to said latching members, said arms being provided with shoulders normally resting on said lid and serving to limit the closing movements of said latching members.

In testimony whereof I have affixed my signature in presence of two witnesses.

EDGAR O. LOEBER.

Witnesses:
O. C. BILLMAN,
L. M. CRAIL.